United States Patent
Onorato

(10) Patent No.: US 7,616,752 B2
(45) Date of Patent: Nov. 10, 2009

(54) METHODS, SYSTEMS, AND COMPUTER PROGRAM PRODUCTS FOR PROVIDING CALL WAITING AND CALLER ID AND FOR TOGGLING BETWEEN ACTIVE AND WAITING CALLS USING SESSION INITIATION PROTOCOL (SIP)

(75) Inventor: Richard A. Onorato, The Colony, TX (US)

(73) Assignee: Santera Systems, LLC, Plano, TX (US)

( * ) Notice: Subject to any disclaimer, the term of this patent is extended or adjusted under 35 U.S.C. 154(b) by 752 days.

(21) Appl. No.: 11/252,975

(22) Filed: Oct. 18, 2005

(65) Prior Publication Data

US 2007/0116233 A1    May 24, 2007

(51) Int. Cl.
*H04M 15/06* (2006.01)
*H04M 3/42* (2006.01)

(52) U.S. Cl. .............................. 379/215.01; 379/207.13
(58) Field of Classification Search ............ 379/215.01, 379/211.01, 212.01, 207.13
See application file for complete search history.

(56) References Cited

U.S. PATENT DOCUMENTS

| | | | |
|---|---|---|---|
| 7,142,534 B1 * | 11/2006 | Whent et al. ................. 370/352 |
| 7,283,545 B2 * | 10/2007 | Picha ......................... 370/401 |
| 7,463,727 B2 * | 12/2008 | Urban et al. ............ 379/142.01 |
| 2002/0114317 A1 * | 8/2002 | Dorenbosch et al. ........ 370/352 |
| 2002/0181674 A1 * | 12/2002 | Cannell et al. ............ 379/93.01 |

* cited by examiner

*Primary Examiner*—William J Deane
(74) *Attorney, Agent, or Firm*—Jenkins, Wilson, Taylor & Hunt, P.A.

(57) ABSTRACT

Methods, systems, and computer program products for providing caller ID and call waiting and for switching or toggling between active and waiting calls using SIP are disclosed. According to one method, a first call is established between a first phone and a SIP termination. The first call is established using the first media connection between the SIP termination and a media gateway and a second media connection between the media gateway and the first phone. During the first call, signaling for establishing a second call to SIP termination is received. In response to the signaling, caller ID information for the second call is communicated to the SIP termination. A hook flash is received from the SIP termination. In response to the hook flash, the SIP termination is connected to the second phone using the first media connection and a third media connection between the media gateway and the second phone.

29 Claims, 6 Drawing Sheets

ND COMPUTER
METHODS, SYSTEMS, AND COMPUTER PROGRAM PRODUCTS FOR PROVIDING CALL WAITING AND CALLER ID AND FOR TOGGLING BETWEEN ACTIVE AND WAITING CALLS USING SESSION INITIATION PROTOCOL (SIP)

TECHNICAL FIELD

The subject matter described herein relates to providing call waiting, caller ID, and toggling between active and waiting calls. More particularly, the subject matter described herein relates to methods, systems, and computer program products for providing call waiting and caller ID and for toggling between active and waiting calls using SIP.

BACKGROUND ART

In conventional PSTN networks, caller ID information can be communicated to a PSTN phone with caller ID display capabilities using in-band signaling. The caller ID information typically includes the directory number from which the caller is calling. Call waiting is a feature that notifies a called party during a call that a call is waiting to be answered and that allows the called party to switch between the active and waiting calls.

In call waiting scenarios, it is desirable to display caller ID information to the called party so that the called party can determine whether to switch to the waiting call. As described above, caller ID information can be communicated to a PSTN phone using in-band signaling, and the called party can decide whether or not to switch. The call waiting indication is typically communicated to the PSTN phone or user by playing a tone to the user over the media connection for the existing call. When the user hears the tone and determines to switch to the waiting call, the user communicates a hook flash to the switch, and the switch replaces the active call with the waiting call. The user can toggle between the active and waiting calls by sending hook flashes to the switch.

In packet telephony networks, it is desirable to provide such caller ID, call waiting, and toggling capabilities. In one conventional implementation, a packet telephony call can be established between first and second phones using out-of-band signaling, such as SIP. When a third phone attempts to call the first phone, the first phone or user can be alerted of the waiting call using an in-band tone, as in the conventional PSTN case. However, it is believed that there is currently no method for communicating caller ID information regarding the waiting call to the first phone, when the first phone is a SIP termination. In addition, if the user of the first phone decides to switch to the waiting call, new media connections between the first phone and a media gateway must be established for the waiting call. Toggling between the active and waiting calls also requires repeated establishment of new media connections between the first phone and the media gateway.

FIG. 1 is a call flow diagram illustrating one conventional solution for toggling between active and waiting calls using SIP and multiple real time transmission protocol (RTP) streams between a SIP phone and a media gateway. Referring to FIG. 1, a first SIP phone P1 100 initially calls a second phone P2 102. The call is established via media gateway controller/media gateway (MGC/MG) 106. A third phone P3 104 attempts to call P1 100 while the first call is in progress.

In line 1 of the message flow diagram, phone P1 100 sends a SIP Invite message to MGC/MG 106 inviting phone P2 102 to a media session. In line 2 of the message flow diagram, MGC/MG 106 sends an Invite message to phone P2 102 inviting phone P2 102 to join the session with phone P1 100. In line 3 of the message flow diagram, phone P2 102 accepts the invitation and forwards a 100 Trying message to MGC/MG 106. In line 3 of the message flow diagram, MGC/MG 106 sends an INVITE message to phone P2 102. In line 4 of the message flow diagram, phone P2 102 sends a 100 Trying message to MGC/MG 106. In line 5 of the message flow diagram, phone P2 102 sends a 200 OK message to MGC/MG 106. In line 6 of the message flow diagram, MGC/MG 106 sends an ACK message to phone P2 102 acknowledging the 200 OK. In line 7 of the message flow diagram, MGC/MG 106 sends a 200 OK message to phone P1 100 indicating that the P2 102 accepted the invitation. In line 8 of the message flow diagram, phone P1 100 sends an ACK message to MGC/MG 106 acknowledging the 200 OK. After line 8 of the message flow diagram, in line 9, a first RTP session, RTP1, is established between phone P1 100 and MGC/MG 106 and a second RTP session, RTP2, is established between MGC/MG 106 and phone P2 102.

In line 10 of the message flow diagram, phone P3 104 calls phone P1 100, and an INVITE message is sent to MGC/MG 106. In line 11 of the message flow diagram, MGC/MG 106 sends a call waiting tone over the RTP stream RTP1 to phone P1 100 indicating that a call is waiting. In line 12 of the message flow diagram, MGC/MG 106 sends an INVITE message to phone P1 100 for the incoming call from phone P3 104. In line 13 of the message flow diagram, phone P1 100 sends a 180 Ringing message to MGC/MG 106 informing MGC/MG 106 that P1 is now ringing. Using conventional SIP methods, however, there is no way for MGC/MG 106 to guarantee that the caller ID information is provided phone P1 100. Accordingly, the user of phone P1 100 may have to determine whether or not to switch without knowing who is calling.

In line 14 of the message flow diagram, phone P1 100 sends a hook flash over the RTP stream to MGC/MG 106. In line 15 of the message flow diagram, phone P1 100 sends an INVITE message to MGC/MG 106 to put phone P2 102 on hold. In line 16 of the message flow diagram, MGC/MG 106 sends a 200 OK message to phone P1 100. In line 17 of the message flow diagram, phone P1 100 sends an acknowledgment message to MGC/MG 106 for the 200 OK message. In line 18 of the message flow diagram, phone P1 100 sends a 200 OK message to MGC/MG 106. In line 19 of the message flow diagram, MGC/MG 106 sends an acknowledgment message to phone P1 100. In line 20 of the message flow diagram, MGC/MG 106 sends a 200 OK message to phone P3 104. In line 21 of the message flow diagram phone P3 104 sends an acknowledgement message to MGC/MG 106. In line 22 of the message flow diagram, third and fourth RTP streams, RTP3 and RTP4, are established to connect phone P1 100 to MGC/MG 106 and phone P2 102 to MGC/MG 106. The third and fourth RTP streams require separate resources on the media gateway of MGC/MG 106 and therefore reduce bandwidth available for other calls. In addition, separate Invite messaging is required for each waiting call. The problem is increased if multiple parties desire to connect with a single party, as in a multi-line conference.

Accordingly, in light of these difficulties associated with providing call waiting, caller ID and toggling between active and waiting calls, there exists a need for methods, systems, and computer program products for providing call waiting and caller ID and for toggling between active and waiting calls using SIP.

SUMMARY

The subject matter described herein relates to methods, systems, and computer program products for providing call waiting and caller ID and for toggling between active and waiting calls using SIP. According to one method, a call is established between a first phone and a SIP termination. Establishing the first call may include establishing a first media connection between the SIP termination and a media gateway and a second media connection between the media gateway and the first phone. A second call from a second phone to the SIP termination is received. Caller ID information regarding the second call is communicated to the SIP termination. A hook flash is received from the SIP termination. In response to the hook flash, the SIP termination is connected to the second phone using the first media connection and a third media connection between the media gateway and the second phone.

The subject matter described herein for providing call waiting and caller ID and for toggling between active and waiting calls using SIP may be implemented using a computer program product comprising computer executable instructions embodied in a computer readable medium. Exemplary computer readable media suitable for implementing the subject matter described herein include chip memory devices, disk memory devices, programmable logic devices, application specific integrated circuits, and downloadable electrical signals. In addition, a computer program product that implements the subject matter described herein may be implemented on a single device or computing platform or may be distributed across multiple devices or computing platforms.

BRIEF DESCRIPTION OF THE DRAWINGS

Preferred embodiments of the subject matter described herein will now be explained with reference to the accompanying drawings of which.

DETAILED DESCRIPTION OF THE INVENTION

Figure 1:
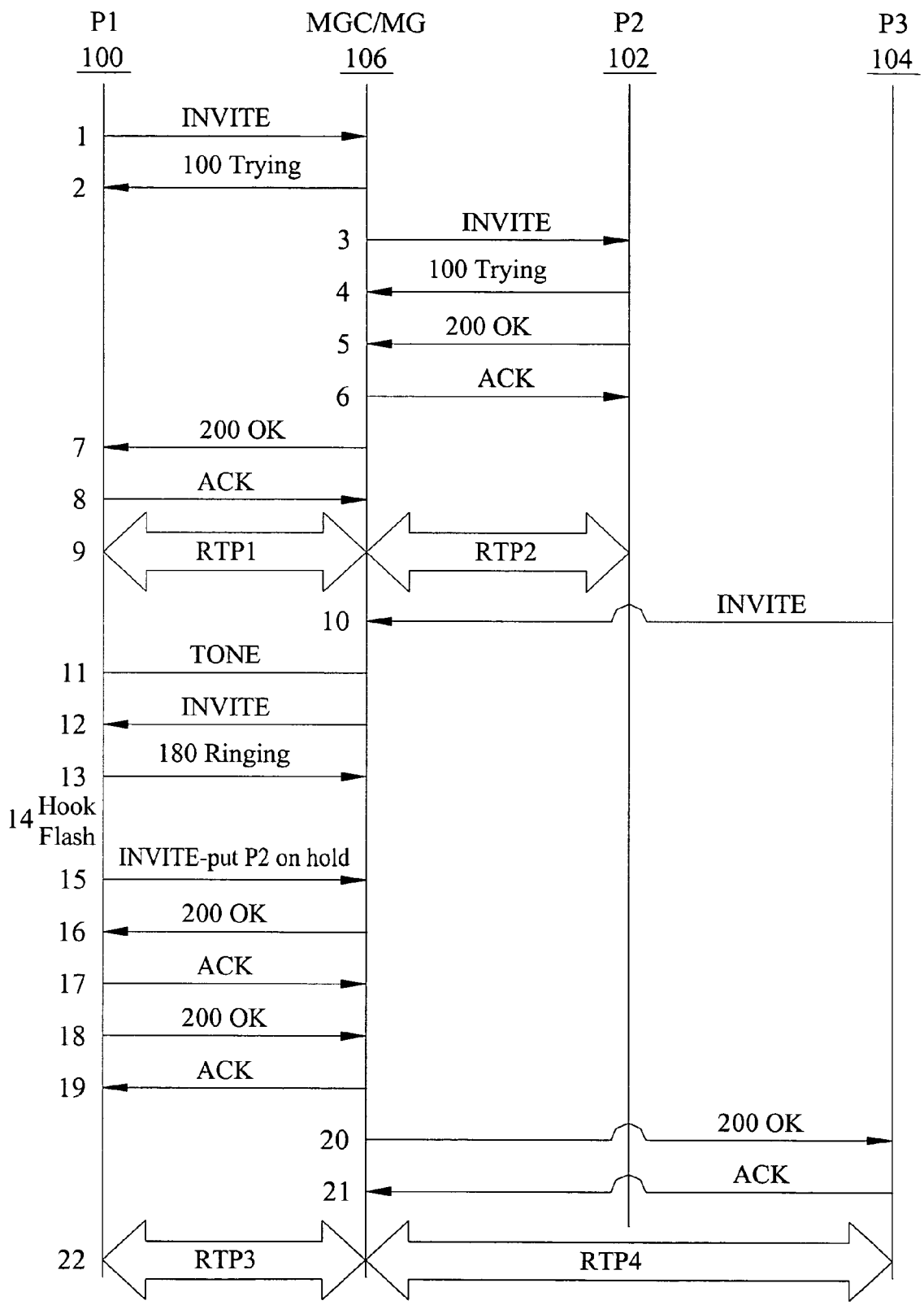
FIG. 1 is a message flow diagram illustrating a conventional method for providing call waiting and for toggling between active and waiting calls.
Figure 2:
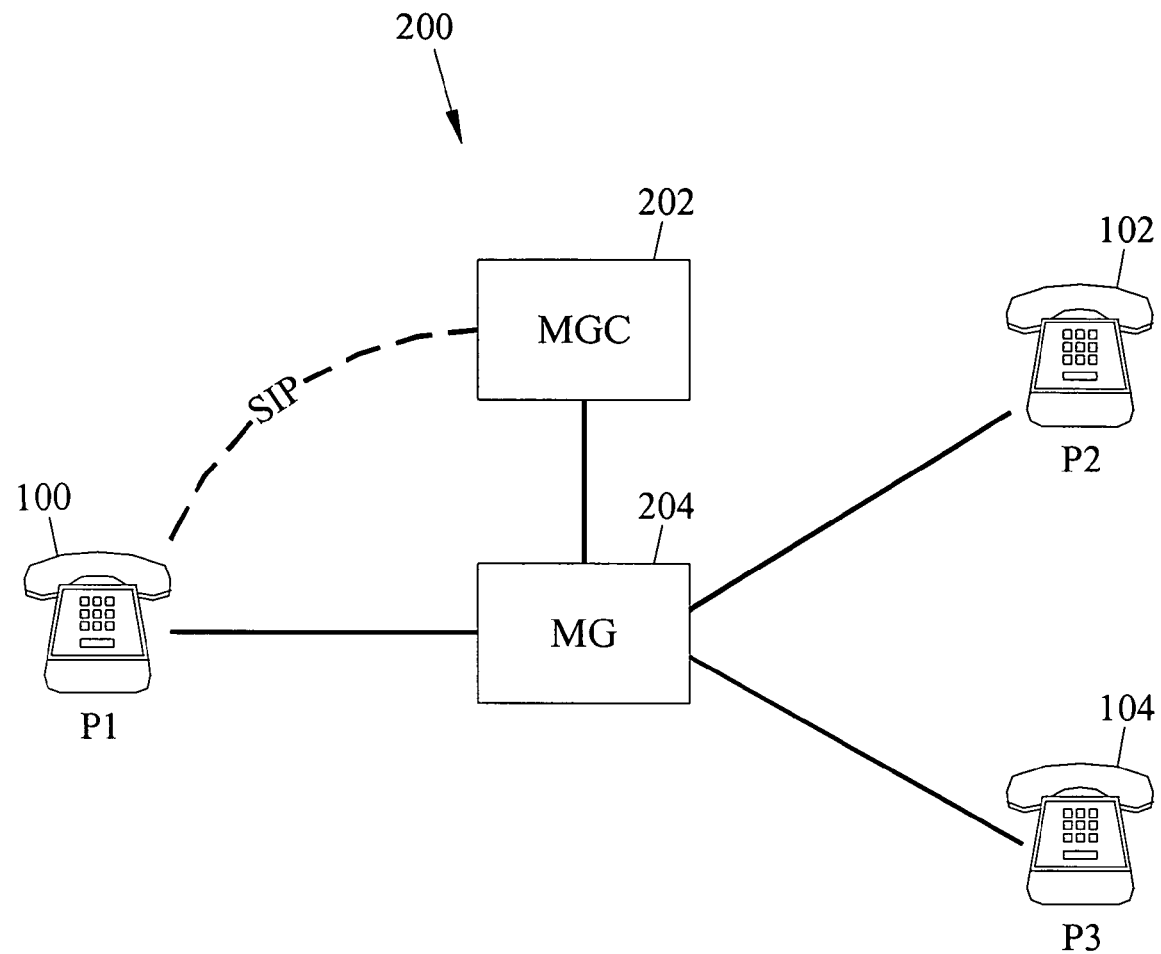
FIG. 2 is a block diagram of a network including a media gateway and the media gateway controller for providing call waiting and caller ID and for toggling between active and waiting calls using SIP according to an embodiment of the subject matter described herein.

The subject matter described herein may be used to provide call waiting, caller ID, and toggle between active and waiting calls for SIP terminations. FIG. 2 is a network diagram illustrating a media gateway and media gateway controller for implementing these services for a SIP termination. Referring to FIG. 2, SIP termination 100 may be a SIP phone, an analog terminal adapter (ATA) device that has SIP signaling capabilities and voice over packet media capabilities, a media gateway/media gateway controller, or any other device that has SIP signaling and voice over packet media capabilities. Phone P2 102 and P3 104 may be SIP phones, ATA devices, or conventional PSTN phones where the signaling used is either in-band or SS7. A media gateway controller/media gateway 200 performs the signaling necessary to establish media connections between call terminations and establishes the media connections. More particularly, for out-of-band signaling, such as SIP, media gateway controller 202 performs the signaling and maintains call state machines. Media gateway controller 202 then sends commands to media gateway 204 to establish the media terminations. Unlike the example illustrated in FIG. 1, media gateway controller 202 is capable of communicating caller ID information to SIP termination 100 using SIP signaling. In addition, MGC/MG 200 is capable of toggling between active and waiting calls using a reduced number of media connections than are required by the implementation illustrated in FIG. 1.

Figure 3:
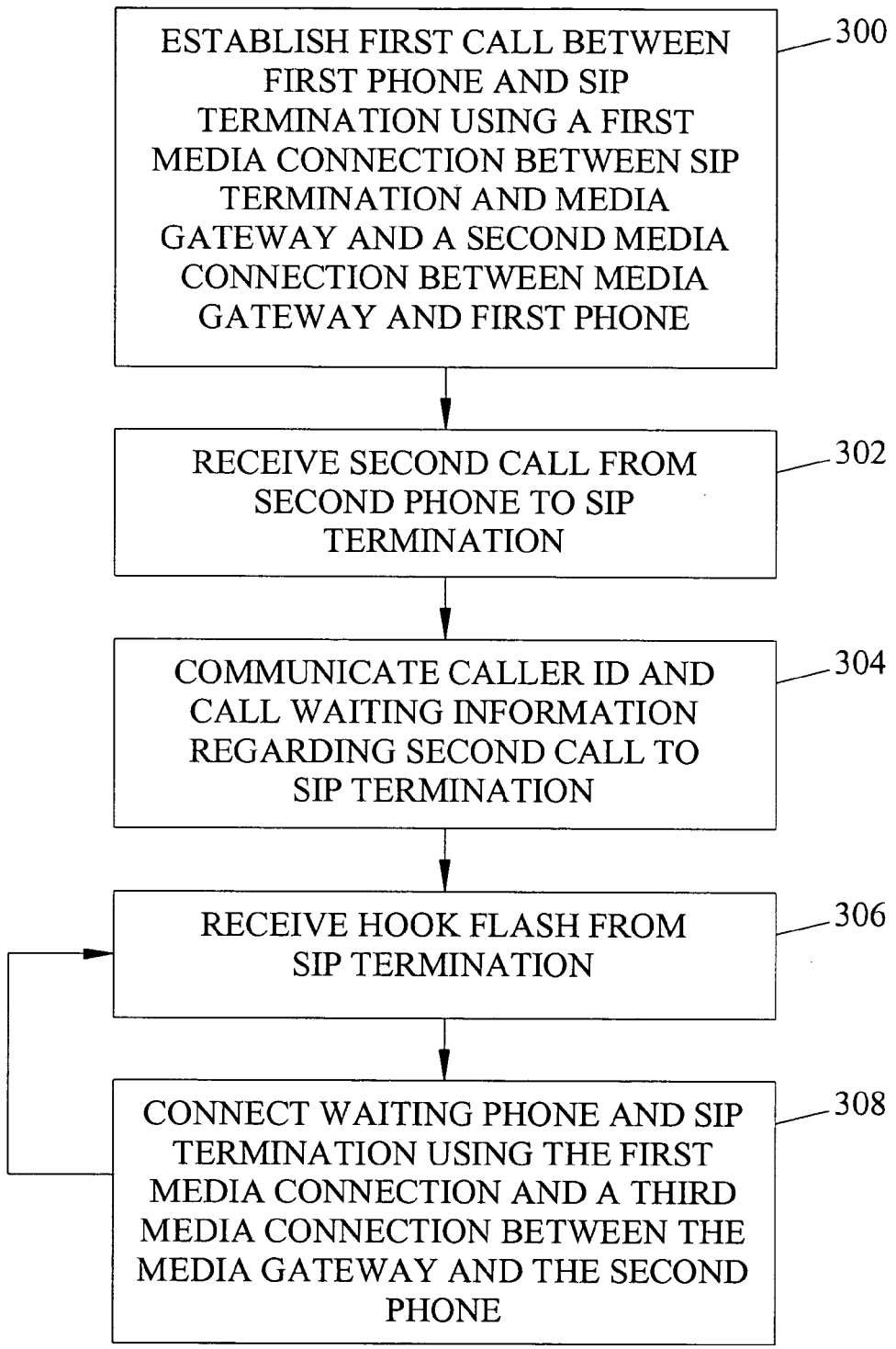
FIG. 3 is a flow chart illustrating an exemplary process for providing call waiting and caller ID and for toggling between active and waiting calls using SIP according to an embodiment of the subject matter described herein.

FIG. 3 is a flow chart illustrating exemplary steps for providing caller ID and call waiting and for toggling between active and waiting calls using SIP according to an embodiment of the subject matter described herein. Referring to FIG. 3, in step 300, a first call is established between a first SIP phone and a SIP termination using SIP. The first call may include a first media connection between the SIP termination and a media gateway and a second media connection between the media gateway and the first phone. In one implementation, MG 204 may establish a separate media connection for each call half. Thus, in FIG. 2, the first media connection may correspond to the call half between phone P1 100 and MG 204 and the second media connection may correspond to the call half between MG 204 and phone P2 102.

In step 302, a second call from a second phone to the SIP termination is received. In FIG. 2, phone P3 104 may call phone P1 100 while the first call is in progress. In step 304, MGC/MG 200 communicates call waiting and caller ID message for the second phone to the SIP termination. This step may include sending a SIP message to phone P1 100 that includes the caller ID information and playing a tone to phone P1 100 over the RTP stream connecting phone P1 100 to MG 204. Alternatively, text indicating that a call is waiting may be communicated to phone P1 100 in the same SIP message as the caller ID information or in a separate SIP message.

In step 306, a hook flash is received from the SIP termination. In step 308, in response to the hook flash, the SIP termination and the second phone are connected using the first media connection and a third media connection between media gateway 204 and phone P3 104. Steps 306 and 308 may be repeated as the user of the SIP termination repeatedly sends hook flashes to toggle between the active and waiting calls. When this occurs, the first media connection is used for both the active and waiting calls. Media gateway 204 toggles between the second and third media connections for the active and waiting calls. Thus, unlike the conventional implementation illustrated in FIG. 2, in the present implementation, a new RTP stream is not required to be established between the media gateway and the SIP termination when switching between the active and waiting calls. As a result, media processing resources of the media gateway are conserved.

Figure 4:
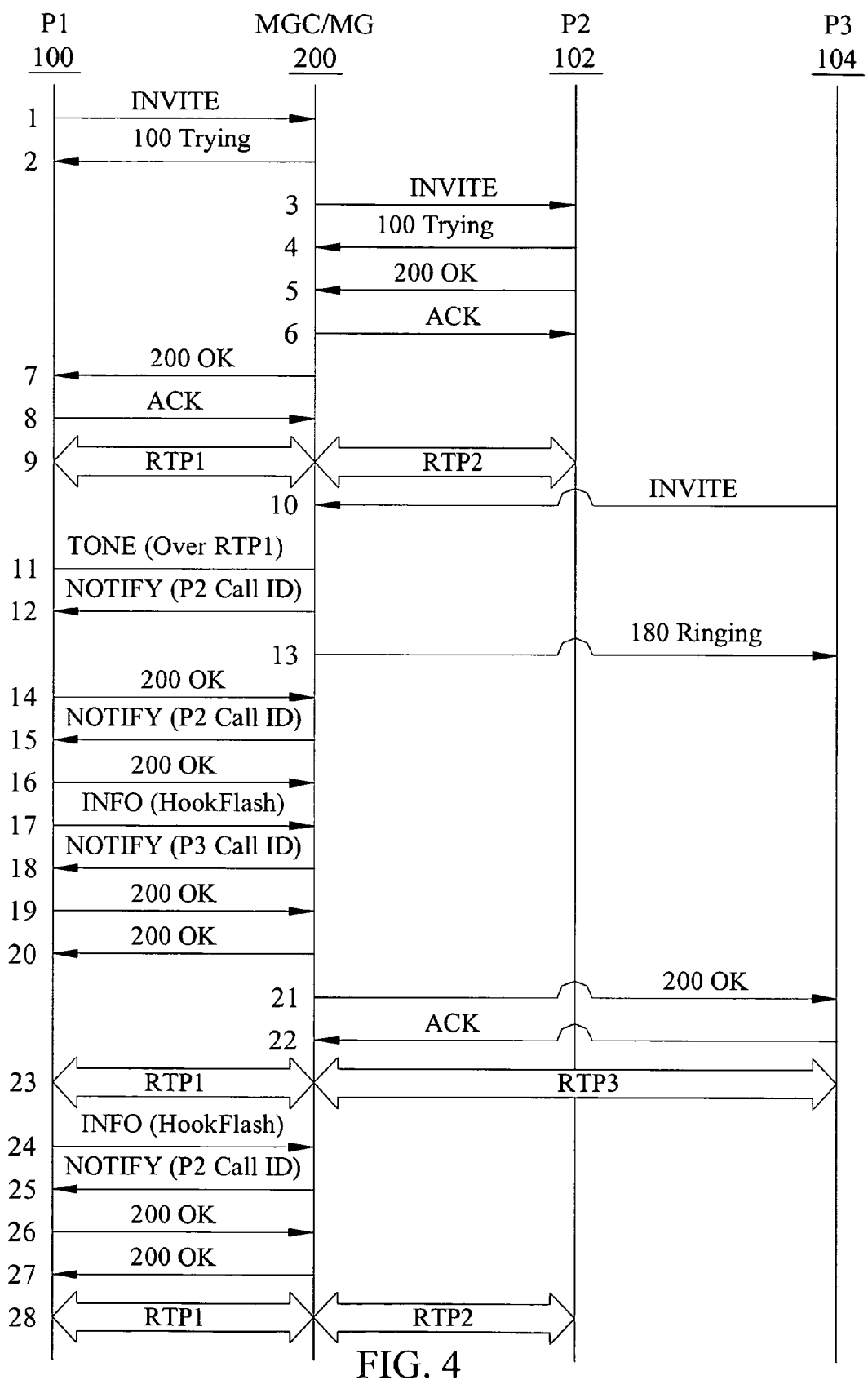
FIG. 4 is a message flow diagram illustrating exemplary messages exchanged between network entities for providing call waiting and caller ID and for toggling between active and waiting calls using SIP according to an embodiment of the subject matter described herein.

FIG. 4 is a message flow diagram illustrating exemplary messages exchanged between MGC/MG 200 and a SIP termination in providing caller ID and call waiting and for toggling between active and waiting calls using SIP according to an embodiment of the subject matter described herein. Referring to FIG. 4, in line 1 of the message flow diagram, phone P1 100 sends an INVITE message to MGC/MG 200 for inviting phone P2 102 a media session or call. In line 2 of the message flow diagram, MGC/MG 200 sends a 100 Trying message to phone P1 100. In line 3 of the message flow diagram, MGC/MG 200 sends an INVITE message to phone P2 102 regarding the session. In line 4 of the message flow diagram, phone P2 102 sends a 100 Trying message to MGC/MG 200. In line 5 of the message flow diagram, phone P2 102 acknowledges the Invite message by sending a 200 OK message to MGC/MG 200. In line 6 of the message flow diagram, MGC/MG 200 sends an ACK message to phone P2 102 acknowledging the 200 OK. In line 7 of the message flow diagram, MGC/MG 200 sends a 200 OK message to phone P1 100 in response to the Invite message in line 1. In line 8 of the message flow diagram, phone P2 102 sends an ACK message to MGC/MG 200 acknowledging the 200 OK. In line 9 of the message flow diagram, MGC/MG 200 establishes RTP streams RTP1 and RTP2 with phone P1 100 and phone P2 102 and connects the media streams to each other.

In line 10 of the message flow diagram, phone P3 104 calls phone P1 100 and an INVITE message is sent to MGC/MG 200. In line 11 of the message flow diagram, MGC/MG 200 plays a call waiting tone to phone P1 100 over RTP1. In line 12 of the message flow diagram, MGC/MG 200 sends a Notify message to phone P1 100. The Notify message may contain a new SIP event, referred to as a call waiting/caller ID event. The call waiting/caller ID event may indicate that a call is waiting. In addition, the call waiting/caller ID event may include caller ID information from phone P3 104. For example, the caller ID information may include the directory number, the SIP URI, and/or other information identifying phone P3 104. As stated above, MGC/MG 200 may also play a tone to phone P1 100 over the RTP channel RTP1. In line 13 of the message flow diagram, MGC/MG 200 sends a 180 Ringing to phone P3 104 to indicate that phone P1 100 is being notified of the new call. In line 14 of the message flow diagram, phone P1 100 acknowledges the Notify message with a 200 OK message. In line 15 of the message flow diagram, MGC/MG 200 sends a Notify message to phone P1 100 to update the Caller Id to reflect phone P2 102. This is done to keep the Caller Id on phone P1 100 up to date. In line 16 of the message flow diagram, phone P1 100 acknowledges the Notify message with a 200 OK message.

In line 17 of the message flow diagram, the user of phone P1 100 sends a hook flash to MGC/MG 200. This triggers a SIP Info message which indicates the hook flash event. The Info message is sent to MGC/MG 200. In line 18 of the message flow diagram, MGC/MG 200 sends a Notify message to phone P1 100 to update the Caller Id to reflect that the connection is with phone P3 104. In line 19 of the Message flow diagram, phone P1 100 acknowledges the Notify message with a 200 OK message. In line 20 of the message flow diagram, MGC/MG 200 acknowledges the Info message with a 200 OK message.

In line 21 of the message flow diagram, MGC/MG 200 sends a 200 OK message to phone P3 104 in response to the Invite message sent in line 10. In line 22 of the message flow diagram, phone P3 104 sends an acknowledgment message to MGC/MG 200 acknowledging the 200 OK message. In line 23, MGC/MG 200 establishes RTP session RTP3 between MGC/MG 200 and phone P3 104. MGC/MG 200 also begins using the existing media connection, RTP1, for the waiting call from phone P3 104. Thus, rather than establishing a new media connection with phone P1 100 for the waiting calls, in the present implementation, MGC/MG 200 uses the existing media stream RTP1 for this purpose. As a result, media processing resources of MGC/MG 200 are conserved.

If the user of phone P1 100 desires to toggle between the active and now waiting call with phone P2 102, the user can simply send new hook flash messages to MGC/MG 200, as indicated in line 24 of the message flow diagram. In line 25 of the message flow diagram, MGC/MG 200 sends a Notify message including caller ID information for phone P2 102. In line 26 of the message flow diagram, phone P1 100 acknowledges the Notify message with a 200 OK message. In line 27 of the message flow diagram, MGC/MG 200 sends a 200 OK message to phone P1 100. In line 28 of the message flow diagram, MGC/MG 200 internally connects RTP stream RTP1 with existing RTP stream RTP2 so that the user of phone P1 100 can communicate with the user or phone P2 102 using the existing RTP streams. Thus, using the steps illustrated in FIGS. 3 and 4, caller ID information can be communicated to a SIP termination and media connections can be reused to toggle between active and waiting calls, as indicated by steps 24-28 in FIG. 3.

Figure 5:
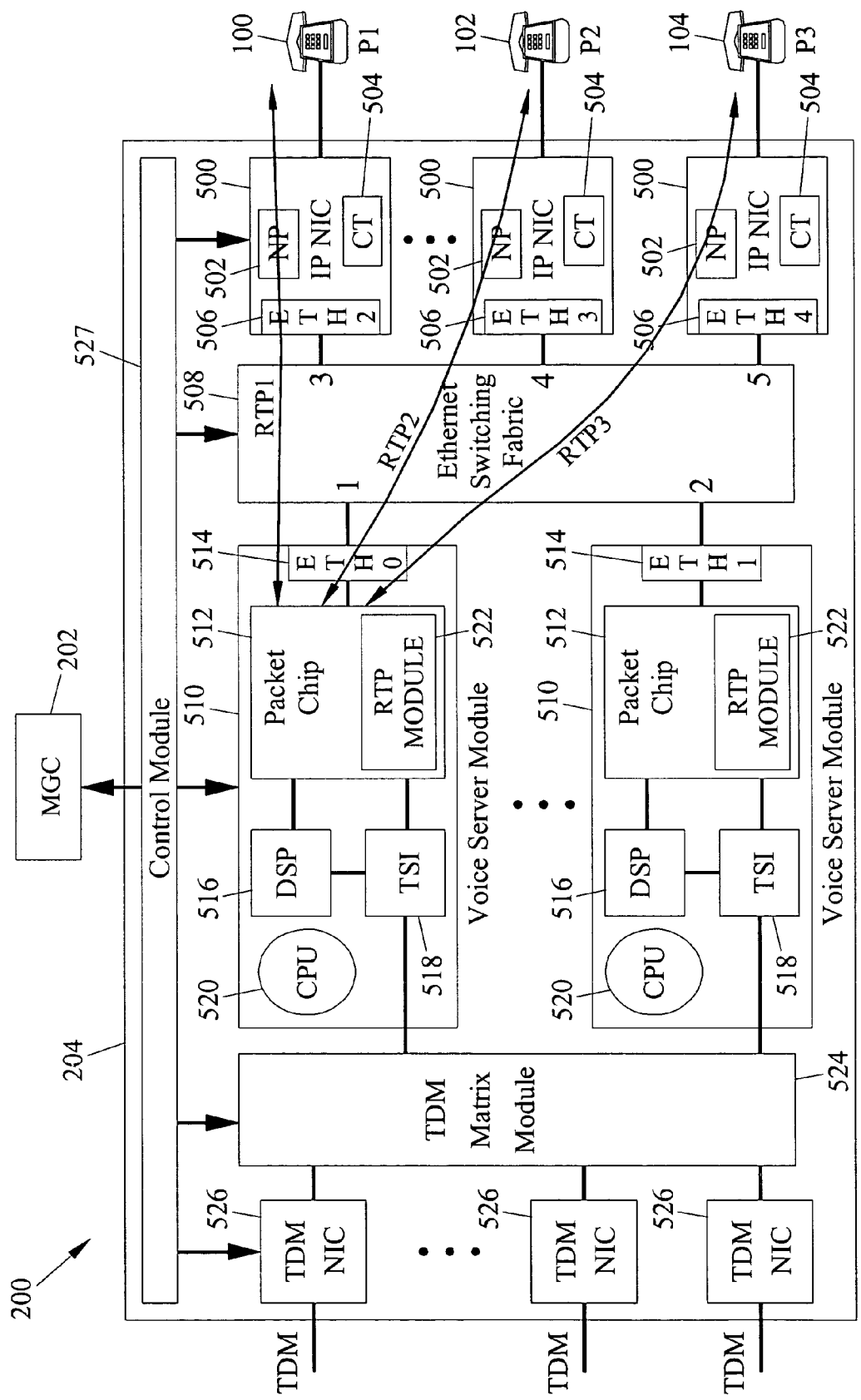
FIG. 5 is a block diagram illustrating an exemplary media gateway and a media gateway controller for providing call waiting and caller ID and for toggling between active and waiting calls using SIP according to an embodiment of the subject matter described herein.

FIG. 5 is a block diagram illustrating an exemplary internal architecture for MG 204 according to an embodiment of the subject matter described herein. In the illustrated example, media gateway 204 includes a plurality of network interfaces 500 that send and receive packets from external devices, such as phones 100, 102, and 104. Each network interface 500 includes a network processor 502, a connection table 504, and an internal Ethernet interface 506. Network processors 502 perform packet forwarding functions based on data stored in connection tables 504. Connection tables 504 store connection identifiers for forwarding incoming and outgoing packets to and from each network interface 500. Internal Ethernet interfaces 506 connect each network interface 500 to an Ethernet switching fabric 508.

Ethernet switching fabric 508 switches Ethernet frames between network interfaces 500 and voice servers 510. Each voice server 510 includes a packet chip 512, an internal Ethernet interface 514, a digital signal processor (DSP) 516, a time slot interconnect (TSI) 518 and a central processing unit (CPU) 520. Packet chips 510 process incoming media packets for voice over IP and voice over ATM connections and formulate outgoing media packets for voice over IP and voice over ATM connections. In one implementation, each packet chip 510 may include an RTP module 522 for implementing real-time transmission protocol functions. Internal Ethernet interfaces 514 connect each voice server 510 to Ethernet switching fabric 508. DSP 516 performs voice processing functions, such as transcoding, echo cancellation, and voice quality enhancement. Time slot interconnect 518 switches voice channels for calls received via TDM matrix module 524. CPU 520 controls the overall operation of each voice server module.

TDM matrix module 524 forwards TDM channels between TDM network interface cards 526 and voice servers 510. Each TDM network interface 526 may interface with one or more TDM channels. A control module 527 controls the overall operation of media gateway 204.

In the example illustrated in FIG. 5, RTP stream RTP1 connects phone P1 100 to voice server 510. Similarly, RTP streams RTP2 and RTP3 connect phones P2 102 and P3 104 to voice server 510. When it is desirable to switch between active and waiting calls, voice server 510 simply connects the appropriate RTP streams corresponding to the desired end device.

Figure 6:
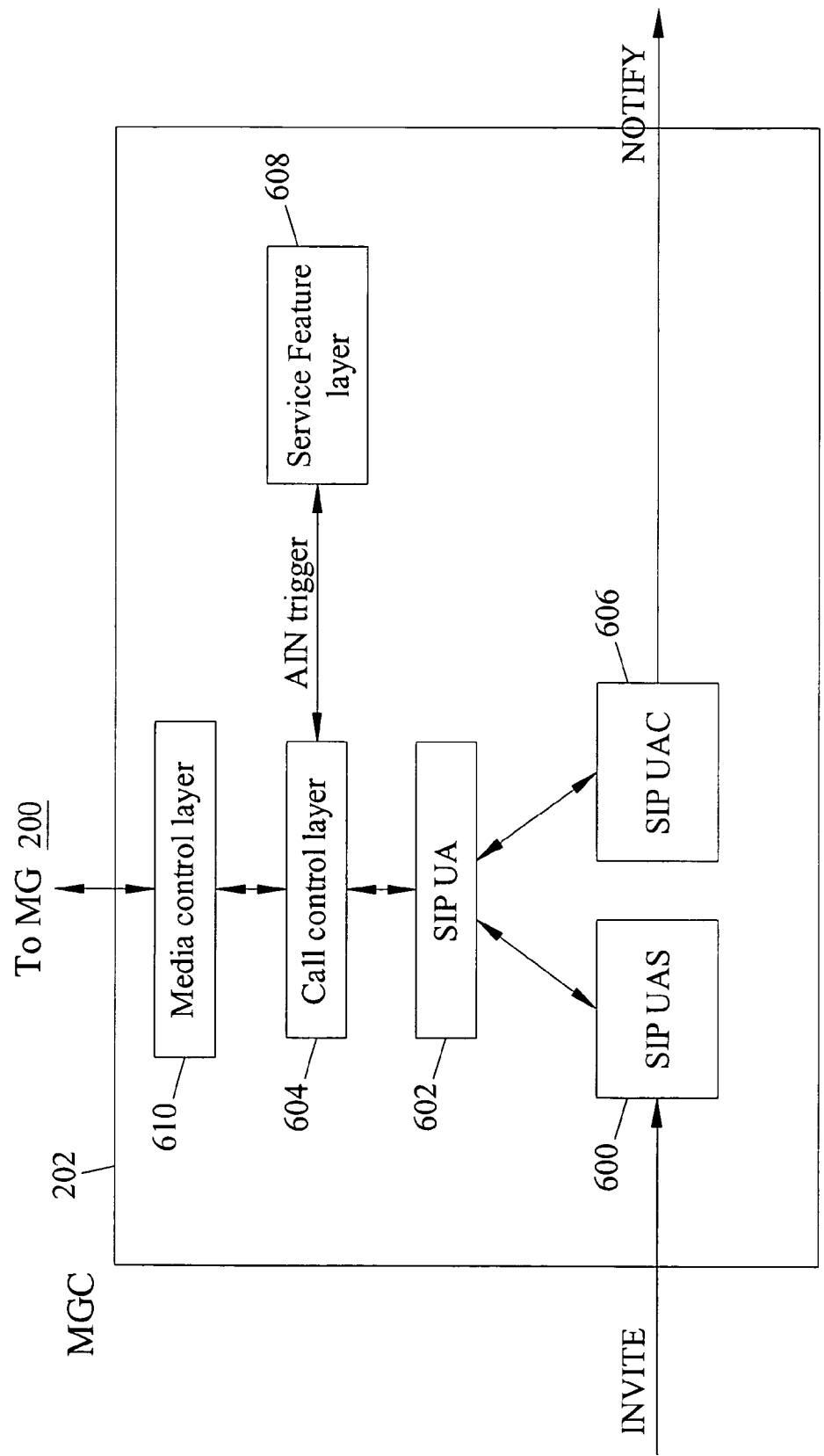
FIG. 6 is a block diagram illustrating an exemplary internal architecture of a media gateway controller from a SIP perspective for providing call waiting and caller ID and for toggling between active and waiting calls using SIP according to an embodiment of the subject matter described herein.

Media gateway controller 202 performs the signaling required to provide the caller ID information, call waiting information, and for processing the signaling for toggling between active and waiting calls. The signaling performed by MGC 202 includes that illustrated in FIG. 4. FIG. 6 is a block diagram illustrating an exemplary internal architecture of media gateway controller 202 from a SIP perspective. Referring to FIG. 6, media gateway controller 202 includes a SIP user agent server 600 for receiving, parsing, and validating SIP request messages, such as Invite messages. SIP user agent server 600 may also send responses for request messages. Once a request message has been validated, SIP user agent server 600 may send the SIP request message to SIP user agent 602 for further action or processing.

SIP user agent 602 may convert SIP messages into a single or multiple internal messages that can be acted on by MGC components. SIP user agent 602 may also route internal messages to the appropriate components of media gateway controller 202 for action. For example, in the case of a new call, a call setup message may be sent to call control layer 604 to establish a new call leg. SIP user agent 602 may also send action results from media gateway controller components to either SIP user agent server 600 or a SIP user agent client 606, depending on whether a message is a new request or a response to an existing SIP request message. SIP user agent client 606 may, based on instructions from SIP user agent 602, compose an outbound SIP request message and send it to the destination specified in the SIP message header.

Call control layer 604 may process call setup messages received from SIP user agent 602. In processing the call setup messages, call control layer 604 may determine if a called party is currently engaged in a call with another called party. In performing call waiting functions, call control layer 604 may interact with service feature layer 608 to determine whether call waiting can be applied to the called party. The interaction between call control layer 604 and service feature layer 608 may occur via AIN triggers, queries, and responses. Call control layer 604 may also generate a call waiting request to SIP user agent 602. Call control layer 604 may interact with a media control layer 610 to instruct a controlled media gateway to provide connection resources for call setup.

Media control layer 610 interacts with media gateways via standard media gateway control protocols, such as H.248/MEGACO to control physical resource allocation as needed by call control layer 604 or service feature layer 608.

It will be understood that various details of the invention may be changed without departing from the scope of the invention. Furthermore, the foregoing description is for the purpose of illustration only, and not for the purpose of limitation.

What is claimed is:

1. A method for providing caller ID information and for switching between active and waiting calls using session initiation protocol (SIP), the method comprising:
   (a) establishing a first call between a first phone and a SIP termination, wherein establishing the first call includes a first media connection between the SIP termination and a media gateway and a second media connection between the media gateway and the first phone;
   (b) during the first call, receiving signaling for establishing a second call from a second phone to the SIP termination;
   (c) in response to the signaling, communicating caller ID information for the second phone to the SIP termination;
   (d) receiving a hook flash from the SIP termination; and
   (e) in response to the hook flash, connecting the SIP termination and the second phone using the first media connection and a third media connection between the media gateway and the second phone, wherein the first media connection is reused in order to toggle between the first call and the second call.

2. The method of claim 1 wherein steps (a)-(e) are implemented using the media gateway.

3. The method of claim 1 wherein communicating the caller ID information for the second call to the SIP termination includes communicating the caller ID information to the SIP termination using a SIP Notify message.

4. The method of claim 1 wherein receiving a hook flash from the SIP termination includes receiving a SIP signaling message including a hook flash event.

5. The method of claim 4 wherein receiving a SIP signaling message including a hook flash event includes receiving a SIP Info message including the hook flash event.

6. The method of claim 1 comprising, in response to receiving hook flashes from the SIP termination, toggling between first and second calls using the first media connection for both the first and second calls and switching between the second and third media connections for the first and second calls.

7. The method of claim 1 comprising, in response to the signaling, communicating call waiting information to the SIP termination.

8. The method of claim 7 wherein communicating the call waiting information to the SIP termination includes communicating the call waiting information to the SIP termination using SIP signaling.

9. The method of claim 8 wherein communicating the call waiting information to the SIP termination using SIP signaling includes communicating the call waiting information to the SIP termination using a Notify message.

10. The method of claim 8 wherein communicating the call waiting information to the SIP termination includes playing a call waiting tone over the first media connection.

11. A system for providing caller ID information and for switching between active and waiting calls using session initiation protocol (SIP), the system comprising:
   (a) a media gateway for establishing a call between a first phone and a SIP termination using a first media connection between the SIP termination and the media gateway and a second media connection between the media gateway and the first phone; and
   (b) a media gateway controller for receiving signaling for establishing a second call to the SIP termination from a second phone, for communicating caller ID information for the second call to the SIP termination, for receiving a hook flash from the SIP termination, and, in response to the hook flash, for controlling the media gateway to connect the SIP termination and the second phone using the first media connection and a third media connection between the media gateway and the second phone, wherein the first media connection is reused in order to toggle between the first call and the second call.

12. The system of claim 11 wherein the media gateway controller is adapted to communicate the caller ID information to the SIP termination using SIP Notify message.

13. The system of claim 11 wherein the media gateway controller is adapted to receive the hook flash from the SIP termination via a SIP message.

14. The system of claim 11 wherein the SIP message comprise a SIP Notify message.

15. The system of 11 comprising, in response to receiving hook flashes from the SIP termination, the media gateway controller is adapted to control the media gateway to toggle between the first and second calls using the first media connection for both calls and switching between the second and third media connections for the first and second calls.

16. The system of claim 11 wherein communicating the call waiting information to the SIP termination includes playing an audible tone to the SIP termination over the first media connection.

17. The system of claim 11 wherein the media gateway controller is adapted to communicate call waiting information for the second call to the SIP termination using a SIP message.

18. The system of claim 17 wherein the media gateway is adapted to use a SIP Notify message to communicate the call waiting information to the SIP termination.

19. The system of claim 11 wherein the first media connection comprises a real time transmission protocol (RTP) connection.

20. A computer program product comprising computer executable instructions embodied in a computer readable medium for performing steps comprising:
   (a) establishing a first call between a first phone and a SIP termination, wherein establishing the first call includes a first media connection between the SIP termination and a media gateway and a second media connection between the media gateway and the first phone;
   (b) during the first call, receiving signaling for establishing a second call from a second phone to the SIP termination;
   (c) in response to the signaling, communicating caller ID information for the second phone to the SIP termination;
   (d) receiving a hook flash from the SIP termination; and
   (e) in response to the hook flash, connecting the SIP termination and the second phone using the first media connection and a third media connection between the media gateway and the second phone, wherein the first media connection is reused in order to toggle between the first call and the second call.

21. The computer program product of claim 19 wherein steps (a)-(e) are implemented using the media gateway.

22. The computer program product of claim 19 wherein communicating the caller ID information for the second call to the SIP termination includes communicating the caller ID information using a SIP Notify message.

23. The computer program product of claim 19 wherein receiving a hook flash from the SIP termination includes receiving a SIP signaling message including a hook flash event.

24. The computer program product of claim 23 wherein receiving a SIP signaling message including a hook flash event includes receiving a SIP Info message including the hook flash event.

25. The computer program product of claim 19 comprising, in response to receiving hook flashes from the SIP termination, toggling between first and second calls using the first media connection for both the first and second calls and switching between the second and third media connections for the first and second calls.

26. The computer program product of claim 19 comprising, in response to the signaling, communicating call waiting information to the SIP termination.

27. The computer program product of claim 26 wherein communicating the call waiting information to the SIP termination includes communicating the call waiting information to the SIP terminations using SIP signaling.

28. The computer program product of claim 27 wherein communicating the call waiting information to the SIP termination using SIP signaling includes communicating the call waiting information to the SIP termination using a Notify message.

29. The computer program product of claim 26 wherein communicating the call waiting information to the SIP termination includes playing an audible tone over the first media connection.

* * * * *

UNITED STATES PATENT AND TRADEMARK OFFICE
CERTIFICATE OF CORRECTION

PATENT NO.       : 7,616,752 B2                                                  Page 1 of 1
APPLICATION NO.  : 11/252975
DATED            : November 10, 2009
INVENTOR(S)      : Richard A. Onorato It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1058 days.

Signed and Sealed this

Nineteenth Day of October, 2010

David J. Kappos
*Director of the United States Patent and Trademark Office*